United States Patent
Tsuruta

(10) Patent No.: US 7,769,813 B2
(45) Date of Patent: Aug. 3, 2010

(54) EMAIL TRANSMISSION TERMINAL APPARATUS, EMAIL TRANSMISSION METHOD AND EMAIL TRANSMISSION PROGRAM

(75) Inventor: Kazuhiro Tsuruta, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/981,187

(22) Filed: Oct. 31, 2007

(65) Prior Publication Data
US 2008/0109523 A1 May 8, 2008

(30) Foreign Application Priority Data
Nov. 2, 2006 (JP) .............................. 2006-299518

(51) Int. Cl.
G06F 15/16 (2006.01)
(52) U.S. Cl. .................. 709/206; 709/204; 709/207; 709/217
(58) Field of Classification Search .......... 709/204–207
See application file for complete search history.

(56) References Cited

U.S. PATENT DOCUMENTS

| 7,383,304 | B2 * | 6/2008 | Shimada et al. | 709/206 |
|---|---|---|---|---|
| 2002/0120869 | A1 * | 8/2002 | Engstrom | 713/201 |
| 2003/0151623 | A1 * | 8/2003 | Shimada et al. | 345/752 |
| 2003/0200265 | A1 * | 10/2003 | Henry | 709/206 |
| 2004/0243679 | A1 * | 12/2004 | Tyler | 709/206 |
| 2005/0044153 | A1 * | 2/2005 | Gross | 709/206 |
| 2006/0069731 | A1 * | 3/2006 | Hirao et al. | 709/206 |
| 2007/0150542 | A1 * | 6/2007 | Sommerer | 709/206 |
| 2007/0255803 | A1 * | 11/2007 | Cherian | 709/217 |

FOREIGN PATENT DOCUMENTS

| JP | 2001-230802 | 8/2001 |
|---|---|---|
| JP | 2001-290715 | 10/2001 |
| JP | 2001-337897 | 12/2001 |
| JP | 2002-324029 | 11/2002 |

\* cited by examiner

Primary Examiner—Wing F Chan
Assistant Examiner—Razu A Miah
(74) Attorney, Agent, or Firm—Harrington & Smith

(57) ABSTRACT

An email transmission apparatus operates to reduce mis-transmission of an email even if a mistake occurs in the check of a destination address. The email transmission apparatus for transmitting a mail to an address designated as a destination includes a counter for counting return mails which were returned with the designated address as a source in response to transmitted mails. The email transmission apparatus further includes a judging function to obtain, from the counter, a receipt frequency of the return mail with a designated address of a mail to be newly transmitted as a source, and to then judges whether the designated address is an address which may cause mis-transmission on the basis of the receipt frequency. Also provided is a notification function that is responsive to the designated address being judged to be an address which may cause mis-transmission. The counter includes a receipt frequency information database for recording a receipt frequency of the past return mails. The judging function determines that the designated address is an address which may cause mis-transmission when the receipt frequency of the return mails is lower than a predetermined threshold value.

9 Claims, 5 Drawing Sheets

EXAMPLE OF A PLURALITY OF ADDRESSES HAVING COMMON LEXICAL UNIT (John) IN ADDRESS BOOK

EMAIL TRANSMISSION TERMINAL APPARATUS, EMAIL TRANSMISSION METHOD AND EMAIL TRANSMISSION PROGRAM

CROSS REFERENCE TO RELATED APPLICATIONS

This application claim priority to Japanese Patent Application No. 2002-299518, filed Nov. 2, 2006.

BACKGROUND OF THE INVENTION

1. Field of the Invention

The present invention relates to an email transmission apparatus, an email transmission method, and an email transmission program. The present invention particularly relates to a method for reducing transmission of an email to a wrong address in an email transmission system such as a personal computer.

2. Description of the Related Art

With the proliferation of the Internet of recent years, the use of emails via providers (Internet access providers) is expanding rapidly, and emails have established themselves as communication means. Additionally, with the start of high-speed packet communication services for digital mobile phones, emails nowadays are transmitted/received also by use of mobile information terminals such as a notebook computer and a personal digital assistant (PDA). With the widespread use of emails, an email system is equipped as standard equipment on a main OS, a World Wide Web (WWW) browser and the like for a personal computer, and this makes it easy to make communications through emails.

FIG. 1 shows the configuration of a conventional typical email system. The email system includes mail client software 05 and a mail address database 06. The mail client software 05 has mail creating means 01, mail address storage control means 03 and the like.

The mail creating means 01 temporarily stores a mail message and a designated destination address in a memory, which are inputted by a sender (a user), and obtains a plurality of addresses similar to the inputted address from the mail address database 06 via the mail address storage means 03 by making a lexical analysis on a part of the designated address. Furthermore, the mail creating means 01 selectably displays the plurality of obtained addresses in a mail header, and allows a message being a main body to be edited and thereby the main body of a mail to be created. Moreover, the mail creating means 01 provides a user with means for transmitting the created email, and sends the email onto a network.

The mail address storage control means 03 has functions of storing and reading a mail address in and from the mail address database 06 (an address book). The mail address storage control means 03 obtains mail addresses from the mail address database 06, and passes the addresses to the mail creating means 01. In addition, the mail address storage control means 03 accepts a request to register a source address of a receive mail in the mail address database 06. A sender is provided with an opportunity to confirm the correctness of a displayed address that is one of the addresses extracted from the mail address database 06 as a result of the lexical analysis on a designated address, and thereby displayed as candidates.

In this manner, in the conventional email system, the mail address storage control means 03 notifies a sender of destination address candidates having lexical units similar to an address designated by the sender and extracted from the mail address database 06 (the address book), and the sender checks the destination address visually, in order to take measures to prevent the transmission of an email to a wrong address (hereinafter, "transmission to a wrong address" is referred to as "mis-transmission."). When the sender designates a plurality of email addresses as destination addresses of a send mail, the sender needs to repeat a visual check on all the email addresses. Accordingly, it is not possible to eliminate a human error in a check.

When the occurrence of an error in a check on the wrong input of a destination address causes mis-transmission, the mistakenly transmitted mail discomforts the receiver of the mail, and causes useless communication traffic. The biggest problem of mis-transmission is that: there is a risk of leaking information to a third party; and a company to which the sender belongs suffers social damage. When a plurality of addresses are designated in the CC list of a receive mail and a return function is used for those addresses, even if a check alert on a return mail is notified, there may be a mistake in checking some addresses. In this case, mis-transmission to addresses that are not supposed to be transmitted to is caused.

There are two conventional techniques as a measure against the mis-transmission of an email. The first conventional technique is to notify a possibility of mis-transmission as an alert message by comparing a destination address inputted at the time of transmitting an email with a mail address previously registered in an address database (an address DB or an address book) (comparison with the address DB).

The second conventional technique is to alert a possibility of mis-transmission by performing a lexical analysis on an inputted destination address and then comparing each lexical unit of a designated address with a lexical unit corresponding to an address recorded in an address database (an address DB) (a lexical analysis+reference to the address DB).

The first conventional technique includes a technique, described in Japanese Patent Application Laid-open Publication No. 2001-337897, for judging "whether or not an inputted address is a non-transmittable address" and for notifying an alert. Japanese Patent Application Laid-open Publication No. 2001-337897 shows a mail transmission apparatus which registers the destination address of a non-transmittable mail in a database as a non-transmittable address at the time of receiving a return mail, and checks whether or not a destination address agrees with the non-transmittable address by referring to the database at the time of transmitting an email.

For example, Japanese Patent Application Laid-open Publication No. 2001-290715, No. 2002-324029, and No. 2001-230802, in which a lexical analysis is performed on a designated address and an address extracted from an address database is compared with the designated address at lexical level, are given as the second conventional measure against mis-transmission.

Japanese Patent Application Laid-open Publication No. 2001-290715 provides a sender with an opportunity of a check by, when inputting a part of a lexical unit of a mail address, retrieving similar addresses from a mail address database on the basis of the lexical unit, and displaying a plurality of addresses.

Japanese Patent Application Laid-open Publication No. 2002-324029 provides a method for preventing an email from being mis-transmitted by: dividing a destination address into domains (lexical units) and classifying the domains into hierarchical levels; comparing the destination address with a reference domain sequentially and hierarchically; and issuing an alert message on the basis of the comparison result on whether or not the agreed lexical unit exceeds the threshold value of a hierarchy level.

Japanese Patent Application Laid-open Publication No. 2001-230802 prevents mis-transmission by: determining whether or not a lexical unit is an assigned name to be transmitted frequently by a sender on the basis of the lexical unit meaning the assigned name of a mail address; and displaying a check message for an alert, taking it as possibly causing mis-transmission to a different destination which exists in a register (an address book) when the assigned name (the lexical unit) is different from the one of the sender registered in a mail address database.

The techniques described in Japanese Patent Application Laid-open Publication No. 2001-337897, No. 2001-290715, No. 2002-324029, and No. 2001-230802 are not useful measures to avoid mis-transmission even if a lexical analysis is performed, in a case where there exist wrong destination addresses in an address database. For example, FIG. 2 shows a case where mail client software refers to an address database (an address book) in order to select a candidate related to a lexical unit, John, which is a part of an inputted address. Since the lexical unit, John, of the correct mail address is common in the address database, when a sender designates the lexical unit in a mail header in the mail creating means, a plurality of similar addresses, for example, two of John-A and John-B, are displayed as candidates. When a plurality of addresses including the commonly lexical unit of John exist, the mis-transmission occurs by the sender mistakenly selecting a wrong address (a mistake in a check).

Furthermore, there may be some people having the first family and second name in an intra-company network in the size of tens of thousands people. In this case, the addresses of these people are distinguished by adding a number and the like. However, it is difficult to instantly distinguish a plurality of similar addresses including numbers in the displayed notice. Even if a "first name" is the same (for example, suzuki or satoh), it is still possible to distinguish addresses by then "second names" as long as the "second names" are different. However, if the "second names" are similar, it is not possible to prevent a human error in a check on a displayed notice of a plurality of mail addresses.

As described above, in a case of the conventional email transmission systems, a mail address database includes all the source addresses of return mails which have been normally received heretofore, but some of the source addressed are old addresses which do not reflect a log of currently used mails. When the address database includes addresses which are not currently used at all, some of the addresses are registered as addresses which may cause mis-transmission. If a human error occurs in a check on a destination address when a destination address candidates are displayed by using this address database, the mis-transmission of an email happens. Such mis-transmission cannot be prevented only by allowing a sender to check a displayed destination address while using an address database (an address book) in which all the past records of used addresses are simply reflected, and by checking the display of a destination address.

SUMMARY OF THE INVENTION

The foregoing and other problems are overcome, and other advantages are realized, through the use of the exemplary embodiments of this invention.

In a first aspect thereof the exemplary embodiments of this invention provide an email transmission apparatus which transmits a mail to an address designated as a destination. The email transmission apparatus includes a counter configured to count mails returned, in response to transmitted mails, with a designated address as a source; a judging function configured to obtain a receipt frequency of return mails having as a source a designated address of a mail to be newly transmitted, and to determine whether the designated address is an address which may cause mis-transmission on the basis of the receipt frequency; and a notification function configured to indicate that the designated address is an address which may cause mis-transmission in response to the judging function determining that the designated address is an address which may cause mis-transmission.

In another aspect thereof the exemplary embodiments of this invention provide an email transmission method for transmitting a mail to an address designated as a destination. The method includes counting mails returned, in response to transmitted mails, with a designated address as a source; obtaining a receipt frequency of return mails having as a source a designated address of a mail to be newly transmitted; determining, whether the designated address is an address which may cause mis-transmission on the basis of the receipt frequency, when the receipt frequency of corresponding return mails is lower than a predetermined threshold value; and notifying a sender that the designated address is an address which may cause mis-transmission in response to determining that the designated address is an address which may cause mis-transmission.

In another aspect thereof the exemplary embodiments of this invention provide a computer readable memory medium storing computer program instructions, execution of which result in operations that comprise counting mails returned, in response to transmitted mails, with a designated address as a source; obtaining a receipt frequency of return mails having as a source a designated address of a mail to be newly transmitted; determining, whether the designated address is an address which may cause mis-transmission on the basis of the receipt frequency, when the receipt frequency of corresponding return mails is lower than a predetermined threshold value; and notifying a sender that the designated address is an address which may cause mis-transmission in response to determining that the designated address is an address which may cause mis-transmission.

In a further aspect thereof the exemplary embodiments of this invention provide an electronic mail apparatus that includes means for counting mails returned, in response to transmitted mails, with a designated address as a source; means for obtaining a receipt frequency of return mails having as a source a designated address of a mail to be newly transmitted; means for determining whether the designated address is an address which may cause mis-transmission on the basis of the receipt frequency, said determining means operating in response to the receipt frequency of corresponding return mails is lower than a predetermined threshold value; and means for notifying a sender that the designated address is an address which may cause mis-transmission in response to determining that the designated address is an address which may cause mis-transmission.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE PREFERRED EMBODIMENT

Detailed descriptions will hereinafter be given of the best mode for carrying out the present invention (hereinafter, referred to as an embodiment), with reference to attached drawings.

Figure 1:
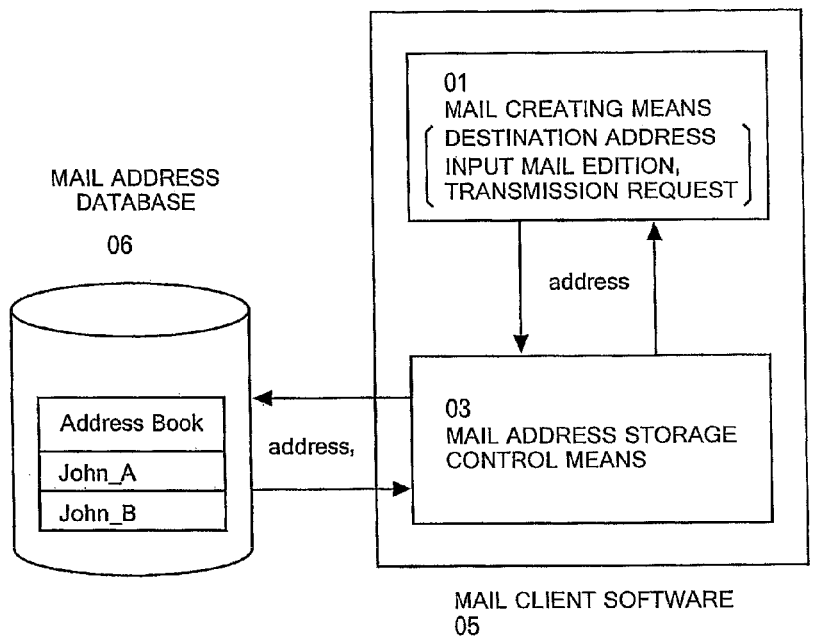
FIG. 1 shows a configuration of a conventional email transmission system.
Figure 2:
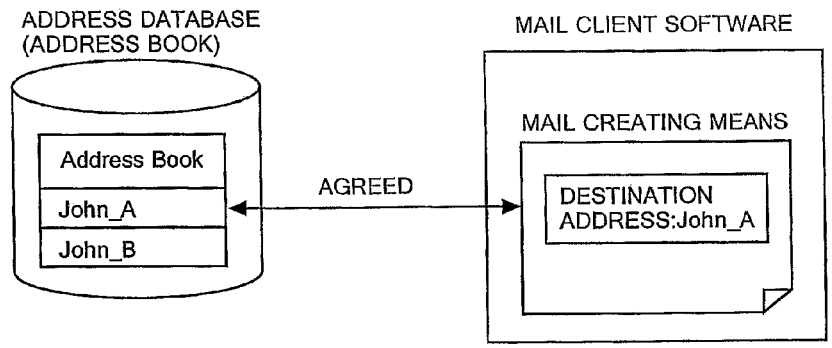
FIG. 2 shows an aspect where conventional mail client software displays two candidates related to a lexical unit, John, of a part of an inputted address and makes a mistake in selection.
Figure 3:
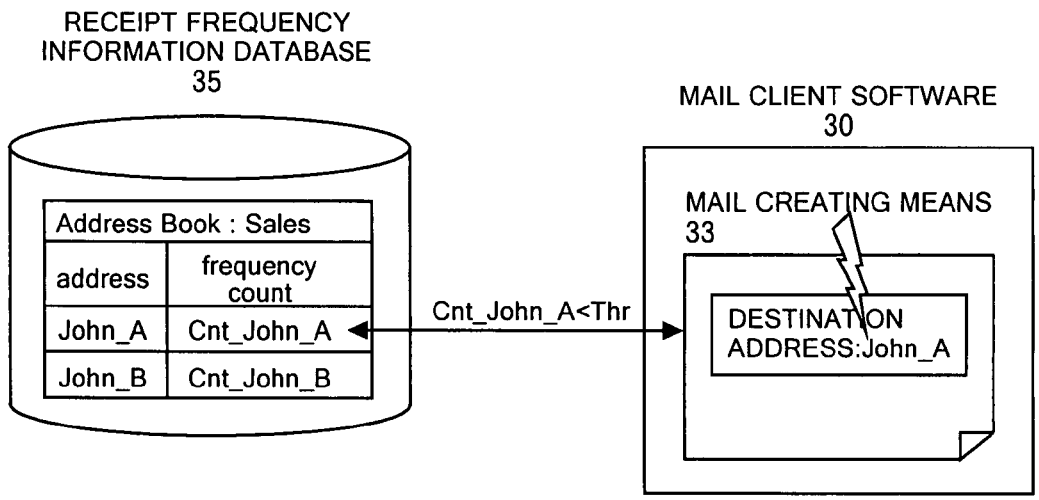
FIG. 3 shows an email system (a relationship between mail client software 30 and a receipt frequency information database 35) according to an embodiment of the present invention.

FIG. 3 shows an email system (a relationship between mail client software 30 and a receipt frequency information database 35) according to an embodiment of the present invention. In the receipt frequency information database 35 shown in FIG. 3, return mails are counted for a send mail and the receipt frequency thereof is recorded in a counter (Cnt_John_A, Cnt_John_B) of each address. An address of a recorded return mail means a normal return mail as a response to a receiver's receipt of the send mail. A return mail which means that a destination address does not exist is handled as a "mis-transmission notification mail", and a counter is set to be always equal to a threshold value (Thr) or lower, for example, a minus value.

Next, a receipt frequency of a "return mail" from a destination address is analyzed at the time of transmitting an email, and an alert is displayed. The correctness of a destination address of a mail which is to be sent from now (a smallness of a possibility of mis-transmission) is measured with the frequency of past "return mails." A receive mail is distinguished between a return mail, a new mail, and a forward mail by the type thereof. Since information exchange between a sender himself/herself and a source is not established for a new mail and a forward mail in the receipt frequency information database 35 of the present invention, these receive mails are distinguished from return mails. With regard to a return mail, information exchange with the source where they are mutually appropriate persons is established since it is a reply to a mail which the sender himself/herself sent.

FIG. 3 shows that, at the time of a request of a sender (a user) for the transmission of a mail, the mail client software 30 refers to the receipt frequency information database 35 and obtains the counter of a designated mail address. If the counter (Cnt_John_A) of a destination mail is equal to a predetermined threshold value (Thr) or higher when actually transmitting a mail, the mail is judged to be transmittable. The mail system judges that there is a small possibility of mis-transmission, and transmits the mail without notifying an alert. Even if there is a small possibility of mis-transmission, the mail client software 30 may display a notice of a check on a destination address just in case, and may cause a sender to execute transmission operation in the end.

Figure 4:
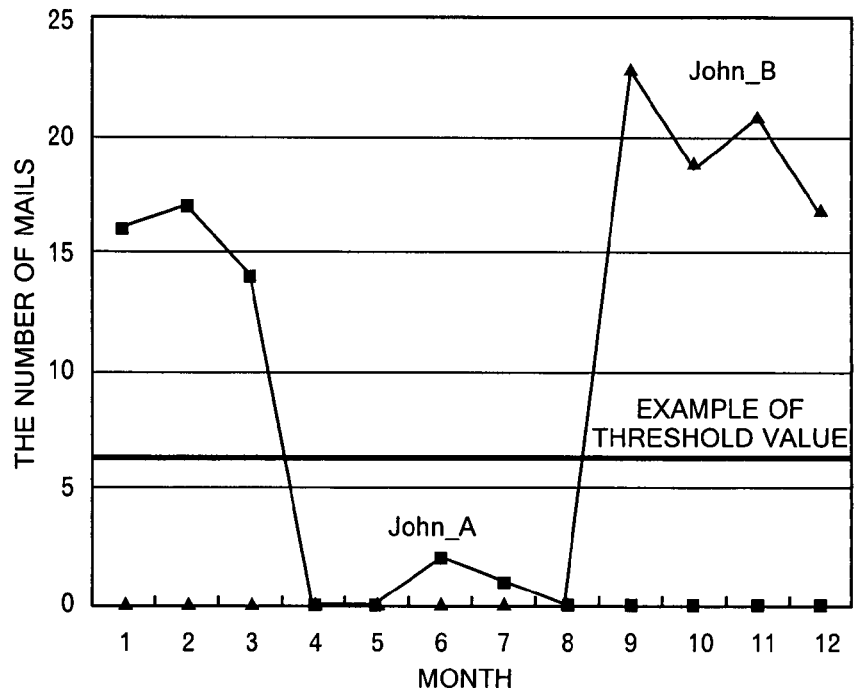
FIG. 4 shows an example of updating a counter for each source address of a return mail recorded in the receipt frequency information database 35.

FIG. 4 shows an example of updating a counter for each source address of a return mail recorded in the receipt frequency information database 35 (FIG. 3). A graph in the example shows a transition of the number of times of receiving a return mail to the normal receipt of send mails, relative to a time series for each address. The graph shows that there are no possibilities of mis-transmission when the receipt frequency of return mails per month of a designated address exceeds a threshold value (Thr), for example. In the example of this graph, the number of times of receiving a normal returned mail is reset every month, and only the receipt frequency of return mails per month is recorded in the receipt frequency information database 35. When the frequency counter (Cnt_John_A) of a mail address (John_A) designated by a sender does not exceed a threshold value (for example, Thr=7), it is judged that there is a small possibility of mistakenly transmitting a mail to the address, John_A. In this case, a fact that the destination address has a strong possibility of mis-transmission is notified at the time of a transmission request, and thus an opportunity to correct the address or stop the transmission is provided for a sender. On the other hand, when there are seven or more return mails to an address, John_B, per month from September to December, since the counters are equal to the threshold value (Thr=7) or higher with regard to these send mails of each month, the possibility of mis-transmission is presumed to be low. Consequently, a transmission request can immediately be executed without notifying a sender of any check. In this case, the sender may be notified, just in case, that the designated address is an address having a small possibility of mis-transmission for confirmation.

Figure 5:
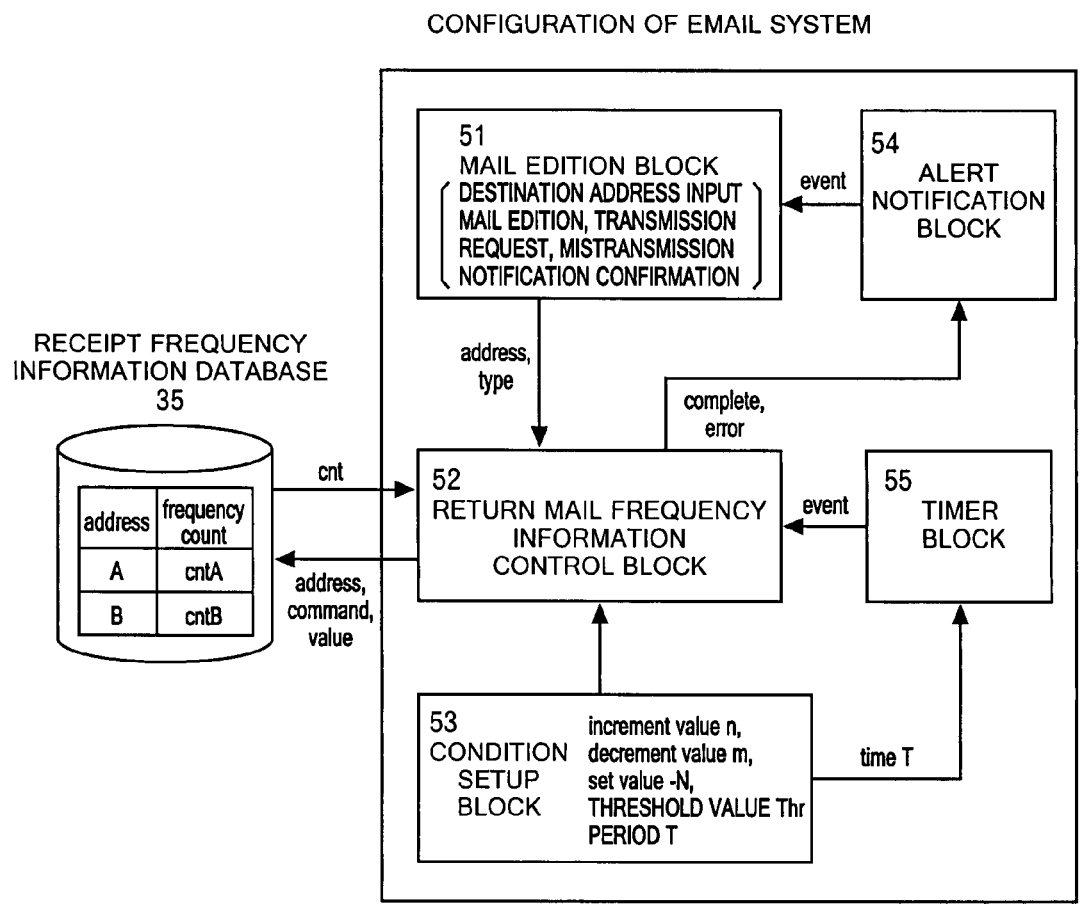
FIG. 5 shows a block diagram of the email system of the present invention.

FIG. 5 shows a block diagram of the email system of the present invention. The email system of the present invention is configured of the mail client software 30 and the receipt frequency information database 35. The mail client software 30 has a mail edition block 51, a return mail frequency information control block 52, a condition setup block 53, an alert notification block 54, and a timer block 55.

The mail edition block 51 inputs the contents and destination address of a mail to be transmitted by a user, and provides an alert notification confirmation of mis-transmission, a user interface to request transmission and the like.

The condition setup block 53 is a block to set each type of conditions (an increment value n, a decrement value m, a value showing a non-existent mail address (set value)-N, a threshold value Thr, and a setup period T).

The return mail frequency information control block 52 reads, evaluates, writes, or changes the contents of the receipt frequency information database 35. This block provides a sender with an interface in which conditions (for example, n=1, m=2, Thr=7, and T=June) to notify an alert can freely be set.

The receipt frequency information database 35 records the source address of a return mail and the return frequency thereof. The return mail frequency information control block 52 creates and updates the contents of the receipt frequency information database 35 by adding the counter of the source address (increment value=1) at the time of receiving a "return mail."

In addition, the return mail frequency information control block 52 judges a possibility of mis-transmission of a destination address, by referring to: each type of condition values of the condition setup block 53; and the counter of the receipt frequency information database 35.

With regard to the judgment result, the alert notification block 54 notifies an alert message at an arbitrary time from the times of inputting a mail address to requesting to transmit a mail in the mail edition block 51. The contents of the notification may include items convenient to display a confirmation for the sender, such as each receipt frequency, brightness display of a part except for a common lexical unit, and the like in addition to a plurality of address candidates.

The timer block 55 clocks to have reached the set period T, and notifies it to the return mail frequency information control block 52. When detecting the notification, the return mail frequency information control block 52 subtracts the decrement value m from a receipt frequency counter corresponding to each address registered in the receipt frequency information database 35.

Figure 6:
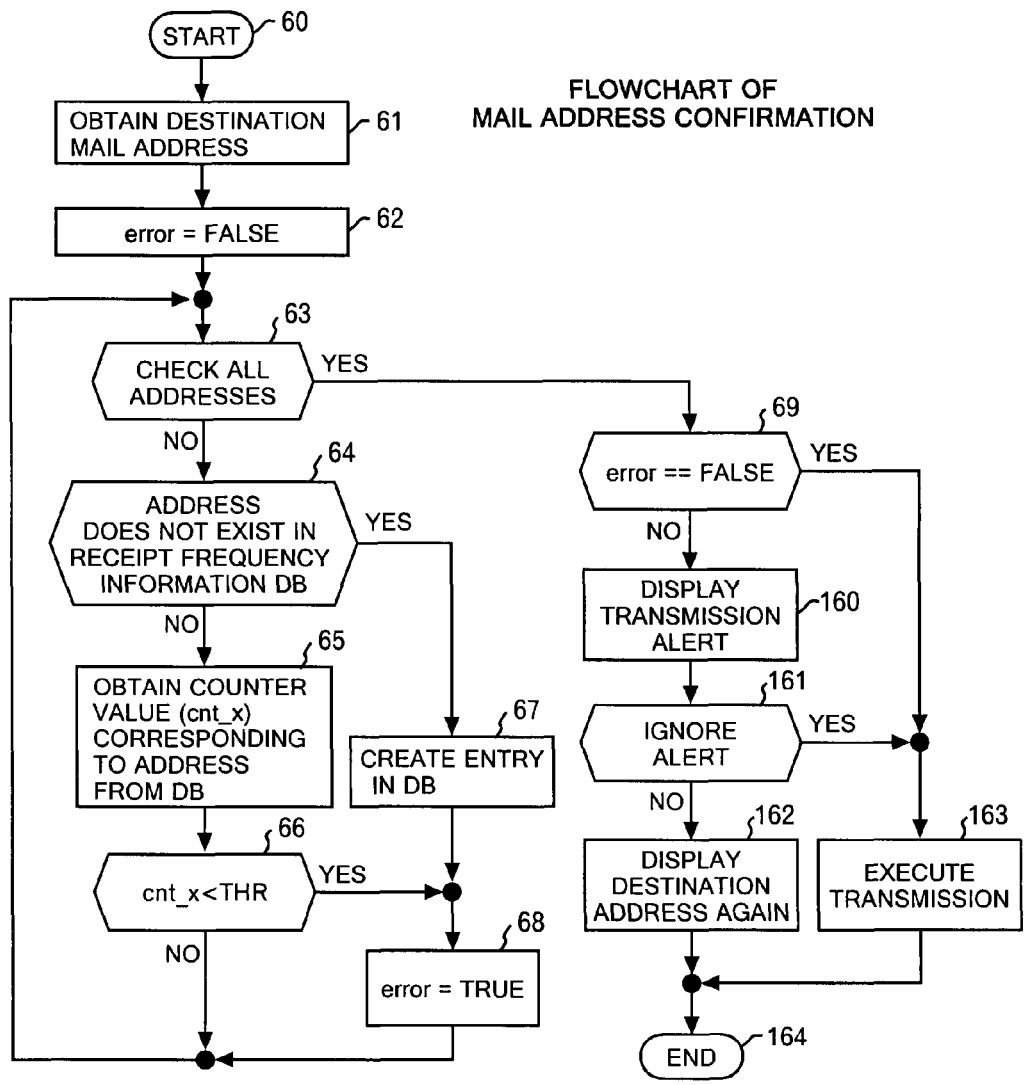
FIG. 6 shows a flowchart of the behaviors of the mail client software of the email system of the present invention at the time of the transmission of a mail.

FIG. 6 shows a flowchart of the behaviors of the mail client software of the email system of the present invention when transmitting a mail. With this flow, a user is encouraged to check a destination address, and a possibility of mis-transmission of an email is realized to be reduced.

1. A sender activates the mail client software, and designates and inputs a designation address. The input destination address is obtained by a mail client SW (61).

A transmission alert flag (error) showing whether or not the destination address is correct is reset to False (62).

2. A receipt frequency counter of the address is obtained from the receipt frequency information database (35 in FIG. 5) where the number of times of receiving a "return mail" is counted, in terms of the inputted destination address. This step is performed on all the designated destination addresses (63).

3. In the process of 2, when the destination address does not exist in the receipt frequency information database (64), an entry is created in the receipt frequency information database for the destination address (67), and a transmission alert flag is put (error=TRUE) (68).

4. When the counter (cnt_x) is lower than a threshold value (Thr) (yes) (66), a transmission alert flag is put (error=TRUE) (68).

5. When the conditions of 3 and 4 are not satisfied (no), a transmission alert flag is not put.

6. After executing the operation from 2 to 5 on all the destination addresses (63), when a transmission alert flag is put (error=TRUE) (69), a transmission alert is displayed (160), thus encouraging a user to check the destination address.

The processes from 1 to 6 are applied to a case where a send mail is the "transmission of a new mail", the "transmission of a forward mail", or the "transmission of a return mail".

Figure 7:
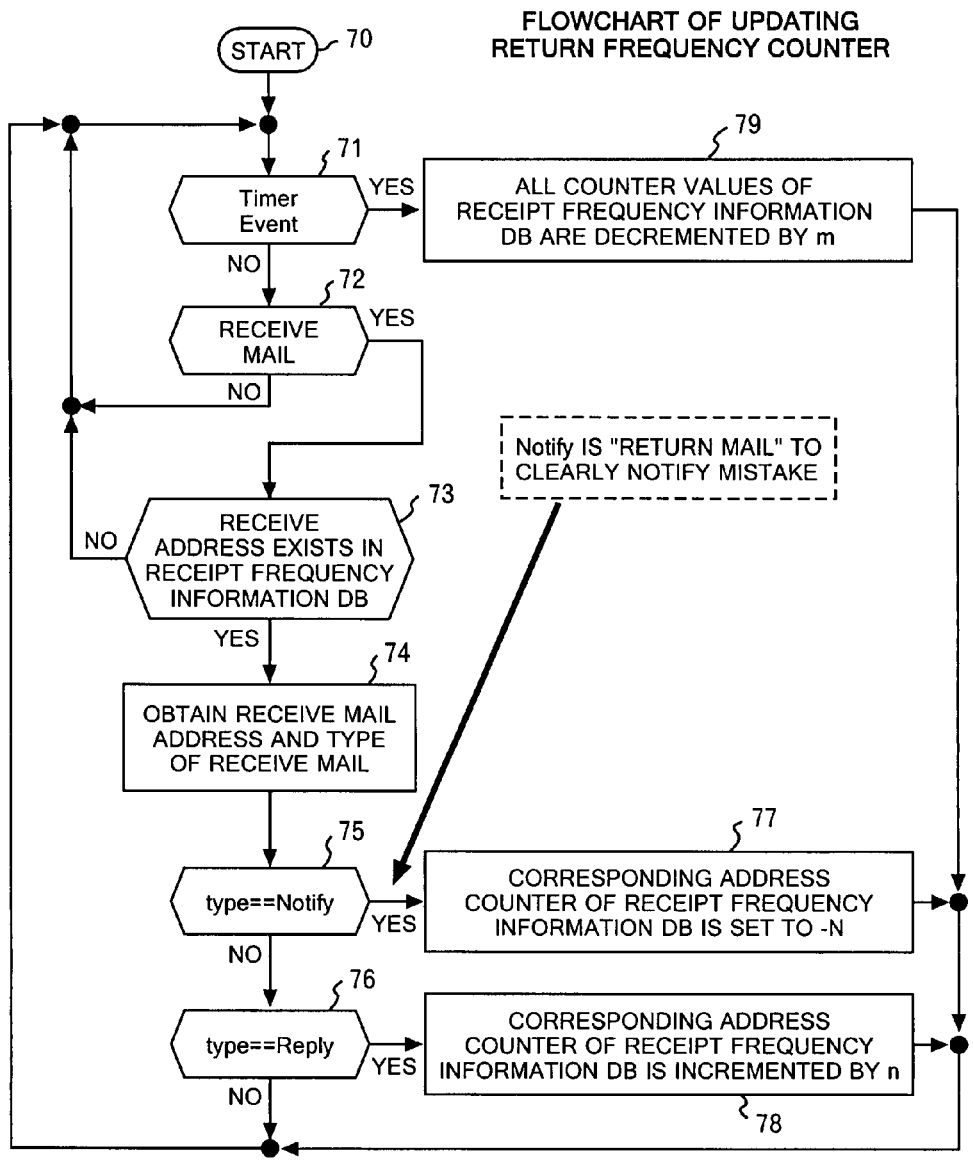
FIG. 7 shows a flowchart that the email system (a return mail frequency information control block 52 of the mail client software) of the present invention updates a counter of the receipt frequency information database 35 at the time of the receipt of a return mail.

FIG. 7 shows a flowchart which updates a receipt frequency counter of the receipt frequency information database 35, when the email system (the return mail frequency information control block 52 of the mail client software) of the present invention receives a return mail.

1. The type of a receive mail (Type) (72) is distinguished between a "new mail (new)", a "forward mail (forward)", a "return mail (reply)", and a "mis-transmission notification mail (Notify)" (74).

2. Setting the correctness of a destination address as a judgment standard, the frequency of receiving a "return mail" is counted. In a case of a "return mail" (76), a source address is searched from destination addresses in the receipt frequency information database, and a corresponding receipt frequency counter is incremented by n (an increment value n: n is a natural number) (78). n is normally equal to one.

3. A receive mail, when the type is (Notify), means a "mis-transmission notification mail" (65). It is different from a normal "return mail", and is used to clearly notify a source of a fact that there was a mistake in the destination address. In a case of a "mis-transmission notification mail", a counter corresponding to a destination address in the receipt frequency information database is set to -N (N is a natural number) (77). By setting the counter to a negative number, the counter does not exceed an arbitrary threshold value (THR is normally a natural number) and is relatively stricter in the setup of the standard than the counters of other destination addresses. When the same address is designated in the next send mail, a transmission alert is always displayed (160 in FIG. 6) for the transmission of the mail which has designated this address.

4. When the types of receive mails are a "new mail" and a "forward mail", nothing is performed on the counter of the receipt frequency information database (76). This is because these mails provide no information on the source addresses.

5. Whenever a certain time passes (71), the counters of all the entries of the receipt frequency information database are decremented by m (m is a natural number) (79). With this, the counters are handled as a "return" mail receipt frequency. In an example of FIG. 4, the set period of the timer is a month, and the operation of decrement resets the counter to 0. The timer time T and the decrement value m can freely be set on the basis of the use environment of a user. The conditions of these values can be set with a user interface provided with the condition setup block of the mail client software in FIG. 4.

Based on the foregoing description, it can be appreciated that an object of the present invention is to provide an email transmission apparatus, an email transmission method and an email transmission program, which reduce mis-transmission of an email even if a sender makes a mistake in a check on a destination address.

The present invention which achieves the above object is realized by the following email transmission apparatus which transmits a mail to an address designated as a destination. This email transmission apparatus includes: counting means for counting return emails which have been returned with the designated address as a source address, in response to the mail to be transmitted; judging means for obtaining, from the counting means, a receipt frequency of the return mails which has a designated address of a mail to be newly transmitted as a source address, and then judging whether or not the designated address is an address which may cause mis-transmission on the basis of the receipt frequency; and notifying means for notifying that the designated address is the address which may cause mis-transmission when the designated address has been judged by the judging means to be the address which may cause mis-transmission.

Specifically, in the above email transmission apparatus, the counting means has: a receipt frequency information database which records a receipt frequency of the past return mails; and database reading/writing control means for reading and writing the receipt frequency from the receipt frequency information database.

Specifically, in the above email transmission apparatus, the database reading/writing control means records the number of times of receiving the return mails for each source address in the receipt frequency information database as the receipt frequency.

Specifically, in the above email transmission apparatus, the receipt frequency is the number of times of receiving the return mails which were received for a predetermined period of time.

Specifically, in the above email transmission apparatus, the predetermined period of time is a first period immediately before transmitting the mail.

Specifically, in the above email transmission apparatus, the database reading/writing control means updates the receipt frequency information database which decreases a certain number from the receipt frequency of the return mails after a second period passed. Specifically, in the above email transmission apparatus, the judging means judges that the designated address is an address which may cause mis-transmission when the receipt frequency of the return mails is lower than a predetermined threshold value.

Specifically, in the above email transmission apparatus, the database reading/writing control means provides a sender with an interface in which the first and second periods, the certain number, and the predetermined threshold value can freely be set.

Specifically, in the above email transmission apparatus, when the return mail has been judged to be a mistakenly transmitted mail, the database reading/writing control means creates an entry in the receipt frequency information database while setting a frequency of a source address of the return mail as an invalid address, and sets a receipt frequency to a value lower than the threshold value.

Moreover, specifically, in the above email transmission apparatus, the database reading/writing control means reads an address similar to a lexical unit included in the designated address from the receipt frequency information database, and the notifying means provides a sender with an opportunity to select the destination address by displaying the read address as a candidate of a destination address.

Specifically, in the above email transmission apparatus, the notifying means provides a sender with an opportunity to judge the destination address on the basis of the receipt frequency by displaying the receipt frequency corresponding to the read address.

The present invention to achieve the above object is realized by the following email transmission method for transmitting a mail to an address designated as a destination.

This email transmission method includes the steps of: counting return mails which were returned with the designated address as a source in response to the mail to be transmitted; judging whether or not a designated address of a mail to be newly transmitted is an address which may cause mis-transmission on the basis of a receipt frequency by obtaining the receipt frequency from the step of counting the return mails with the designated address as a source; and notifying that the designated address is the address which may cause mis-transmission when the designated address has been judged to be the address which may cause mis-transmission in the judging step.

The present invention to achieve the above object is realized by the following email transmission program which transmits a mail to an address designated as a destination.

The email transmission program causes a computer to operate as an email transmission apparatus including: counting means for counting return mails which were returned with the designated address as a source in response to the mail to be transmitted; judging means for obtaining a receipt frequency of the return mails with a designated address to be newly transmitted as a source from the counting means, and judging whether or not the designated address is an address which may cause mis-transmission on the basis of the receipt frequency; notifying means for notifying that the designated address is the address which may cause mis-transmission, when the designated address has been judged by the judging means to be the address which may cause mis-transmission.

According to the present invention configured as described above, there are advantageous effects to reduce a possibility of mis-transmission, even if there is a mistake in the selection of a destination address, when a plurality of address candidates similar to a designated address are displayed from the database of mail addresses at the time of transmitting an email.

The present invention has been described above by using exemplary embodiments. Although the preferred embodiment of the present invention has been described in detail, it should be understood that various changes, substitutions and alternations can be made therein without departing from spirit and scope of the inventions as defined by the appended claims, as long as being the invention of an email transmission system which uses the use history (for example, a receipt frequency) of an address of a return mail responding to a send mail in order to judge a possibility of future mis-transmission of send mails.

What is claimed is:

1. An apparatus comprising:
a memory; and
a processor configured to update a counter value for an email address by incrementing or decrementing the counter value based on at least one second email received in response to at least one first email that was transmitted to the email address, where the processor is further configured, in response to a user inputting the email address as a destination for an email, to obtain from the memory a counter value for the email address, where the processor is further configured to compare the obtained counter value to a threshold value in order to determine whether the email address has a high possibility to cause a mis-transmission, wherein it is determined that the email address has a high possibility to cause a mis-transmission when the obtained counter value for the email address is lower than the threshold value, where the processor is further configured to notify the user in response to determining that the email address has a high possibility to cause a mis-transmission, where the processor is further configured, in response to the user inputting the email address as the destination for the email, to obtain from a database another address that is similar to a lexical unit of the email address, to display the other address as a candidate of the destination for the email, and to provide the user with an opportunity to select the destination from among the email address and the other address, where updating the counter value is performed over a first period of time preceding the user inputting the email address as the destination for the email, where updating the counter value further comprises in response to determining that a second email is a mis-transmission notification email, setting the counter value for the email address to be less than the threshold value, where updating the counter value further comprises subtracting a predetermined number from the counter value after a second period of time, where the database comprises a plurality of addresses with corresponding counter values and includes the email address and the counter value.

2. The apparatus of claim 1, further comprising an interface configured to enable the user to set at least one of the first period of time, the second period of time, the predetermined number and the threshold value.

3. The apparatus of claim 1, wherein the database includes another counter value corresponding to the other address and wherein the processor is further configured to display the other counter value corresponding to the other address when providing the user with the opportunity to select the destination.

4. A method comprising:
- updating a counter value for an email address by incrementing or decrementing the counter value based on at least one second email received in response to at least one first email that was transmitted to the email address;
- in response to a user inputting the email address as a destination for an email, obtaining the counter value for the email address;
- comparing the obtained counter value to a threshold value in order to determine whether the email address has a high possibility to cause a mis-transmission, wherein it is determined that the email address has a high possibility to cause a mis-transmission when the obtained counter value for the email address is lower than the threshold value;
- notifying the user in response to determining that the address has a high possibility to cause a mis-transmission; and
- in response to the user inputting the email address as the destination for the email, obtaining from a database another address that is similar to a lexical unit of the email address, displaying the other address as a candidate of the destination for the email, and providing the user with an opportunity to select the destination from among the email address and the other address, where updating the counter value is performed over a first period of time preceding the user inputting the email address as the destination for the email, where updating the counter value further comprises in response to determining that a second email is a mis-transmission notification email, setting the counter value for the email address to be less than the threshold value, where updating the counter value further comprises subtracting a predetermined number from the counter value after a second period of time, where the database comprises a plurality of addresses with corresponding counter values and includes the email address and the counter value.

5. A computer readable memory medium storing computer program instructions, execution of which result in operations comprising:
- updating a counter value for an email address by incrementing or decrementing the counter value based on at least on second email received in response to at least one first email that was transmitted to the email address;
- in response to a user inputting the email address as a destination for an email, obtaining the counter value for the email address;
- comparing the obtained value for the email address to a threshold value in order to determine whether the email address has a high possibility to cause a mis-transmission, wherein it is determined that the email address has a high possibility to cause a mis-transmission when the obtained counter value for the email address is lower than the threshold value;
- notifying the user in response to determining that the email address has a high possibility to cause a mis-transmission; and
- in response to the user inputting the email address as the destination for the email, obtaining from a database another address that is similar to a lexical unit of the email address, displaying the other address as a candidate of the destination for the email, and providing the user with an opportunity to select the destination from among the email address and the other address, where updating the counter value is performed over a first period of time preceding the user inputting the email address as the destination for the email, where updating the counter value further comprises in response to determining that a second email is a mis-transmission notification email, setting the counter value for the email address to be less than the threshold value, where updating the counter value further comprises subtracting a predetermined number from the counter value after a second period of time, where the database comprises a plurality of addresses with corresponding counter values and includes the email address and the counter value.

6. The computer readable memory medium of claim 5, the operations further comprising: providing an interface that enables the user to set at least one of the first period of time, the second period of time, the predetermined number and the threshold value.

7. The computer readable memory medium of claim 5, wherein the database includes another counter value corresponding to the other address, the operations further comprising displaying the other counter value corresponding to the other address when providing the user with the opportunity to select the destination.

8. The method of claim 4, further comprising: providing an interface that enables the user to set at least one of the first period of time, the second period of time, the predetermined number and the threshold value.

9. The method of claim 4, wherein the database includes another counter value corresponding to the other address, the method further comprising displaying the other counter value corresponding to the other address when providing the user with the opportunity to select the destination.

* * * * *